T. & P. D. ELLER.
WORM DRIVE MECHANISM FOR WINDMILL ENGINES.
APPLICATION FILED MAY 16, 1917.
1,249,931.
Patented Dec. 11, 1917.
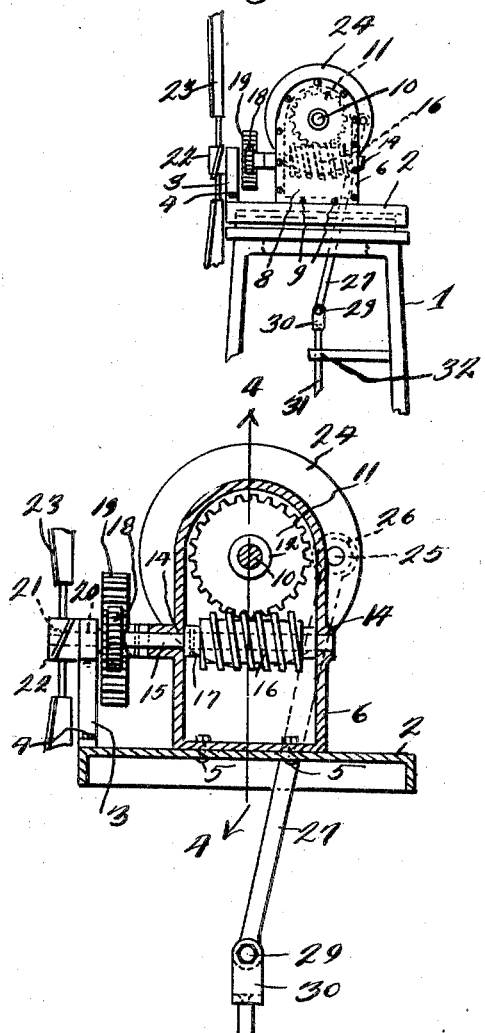
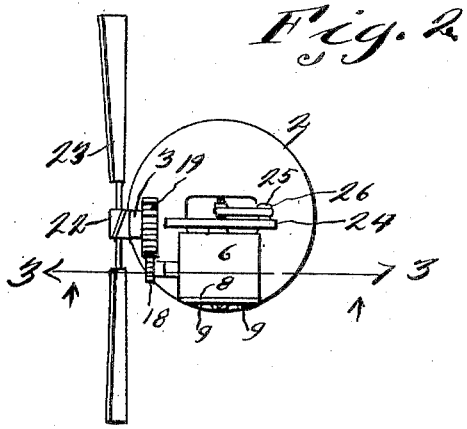
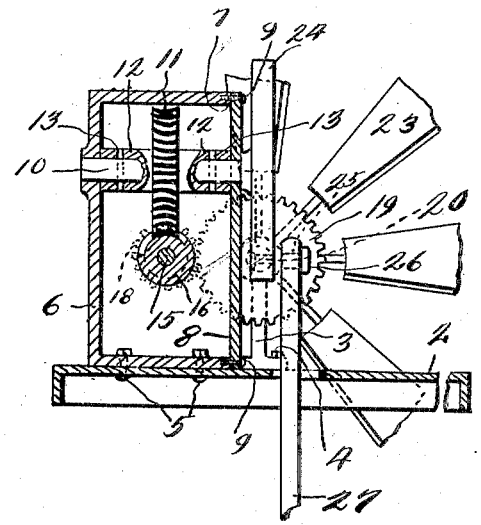

UNITED STATES PATENT OFFICE.

TOM ELLER AND PERNELL D. ELLER, OF PAMPA, TEXAS.

WORM DRIVE MECHANISM FOR WINDMILL-ENGINES.

1,249,931.  Specification of Letters Patent.  Patented Dec. 11, 1917.

Application filed May 16, 1917. Serial No. 169,064.

*To all whom it may concern:*

Be it known that we, TOM ELLER and PERNELL D. ELLER, citizens of the United States, residing at Pampa, in the county of Gray, State of Texas, have invented a new and useful Worm Drive Mechanism for Windmill-Engines; and we do hereby declare the following to be a full, clear, and exact description of the invention, such as will enable others skilled in the art to which it appertains to make and use the same.

This invention relates to an improved drive mechanism or connection between a wind wheel drive shaft and a reciprocating member, such as a pump rod.

One of the objects of the invention is to provide a device of the worm drive type, whereby a medium slow and exceedingly uniform reciprocating motion may be imparted to the reciprocating member.

A further object of the invention is to provide a suitable housing in which the worm and the worm wheel connection is housed, whereby the shafts of the worm and the worm wheel are mounted in bearings and at right angles to each other, thereby simplifying and rendering more efficient the structure of such devices, and at the same time insuring a more positive movement for the reciprocating member.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in side elevation of the upper part of a wind mill or wind mill engine, showing the improved drive mechanism applied.

Fig. 2 is a plan view.

Fig. 3 is a sectional view on line 3—3 of Fig. 2.

Fig. 4 is a sectional view on line 4—4 of Fig. 3.

Referring more especially to the drawings, 1 designates the upper part of a wind mill frame, on which a conventional form of turn table 2 is mounted to revolve in any suitable manner, not shown. Mounted upon the turn table 2 is an upright bearing arm 3, through the feet of which, bolts 4 extend, to secure the bearing arm rigidly in position. Secured by bolts 5 to the turn table, is a suitable rectangular housing 6, the open sides 7 of which is closed by the plate 8, which is secured in place by the bolts or screws 9. Mounted in bearings of one side of the housing and the plate 8, is a shaft 10, on which a worm wheel 11 is mounted. The hubs 12 of the worm wheel are secured by the pins 13 to the shaft 10, so that the wheel 11 will rotate with the shaft. Mounted in bearings 14 of the housing and at right angles to and below the shaft 10, is a second shaft 15, on which a worm 16 is secured by means of a pin 17, and with which worm, the worm wheel 11 meshes. On one end of the shaft 15 is a pinion 18, which meshes with the gear 19, which in turn is rotatable with the shaft 20 mounted in the upright arm 3. Also keyed at 21 to the shaft 20, but on the opposite side of the arm to the gear 19 is the hub 22 of the wind wheel 23. When revoluble impulses are imparted to the windwheel by the force of the wind, revoluble motion is transmitted to the shaft 15, through the intermeshing gears 18 and 19, thereby imparting a comparatively slow, steady but uniform revoluble motion to the worm wheel 11 and shaft 10. On one end of the shaft 10, to rotate therewith, is a disk or wheel 24, to an eccentrically mounted pin 25 (which is headed as shown at 26) of which a pitman 27 is pivotally connected, which pitman, in turn, is pivotally connected to a bolt 29 of the bifurcated end 30 of a reciprocating pump rod 31 (which may be connected to any suitable means to be operated, not shown) which is mounted in a suitable bearing 32 of the windmill frame. When motion is imparted to the shaft 10, it is clear that a reciprocating motion is in turn imparted to the pump rod.

The invention having been set forth, what is claimed as new and useful, is:—

In a device as set forth, a support, a base swiveled to rock thereon, and having a bearing, a revoluble driven member mounted in said bearing of the base, a housing mounted on the base and provided with two sets of bearings, a shaft mounted in one set of bearings of the housing and in parallelism with the driven member, a second shaft mounted in bearings of the housing above and at right angles to the first shaft, worm and worm wheel connections between the two shafts, gear connections between the first shaft and the driven member, a reciprocating device, and a disk mounted on the second shaft and having connections with the reciprocating device for operating the same.

In testimony whereof we have signed our names to this specification in the presence of two subscribing witnesses.

TOM ELLER.
PERNELL D. ELLER.

Witnesses:
EDW. VICAN,
B. E. FINLEY.